No. 810,992. PATENTED JAN. 30, 1906.
O. O. STORLE.
ELASTIC FLUID TURBINE.
APPLICATION FILED AUG. 15, 1904.
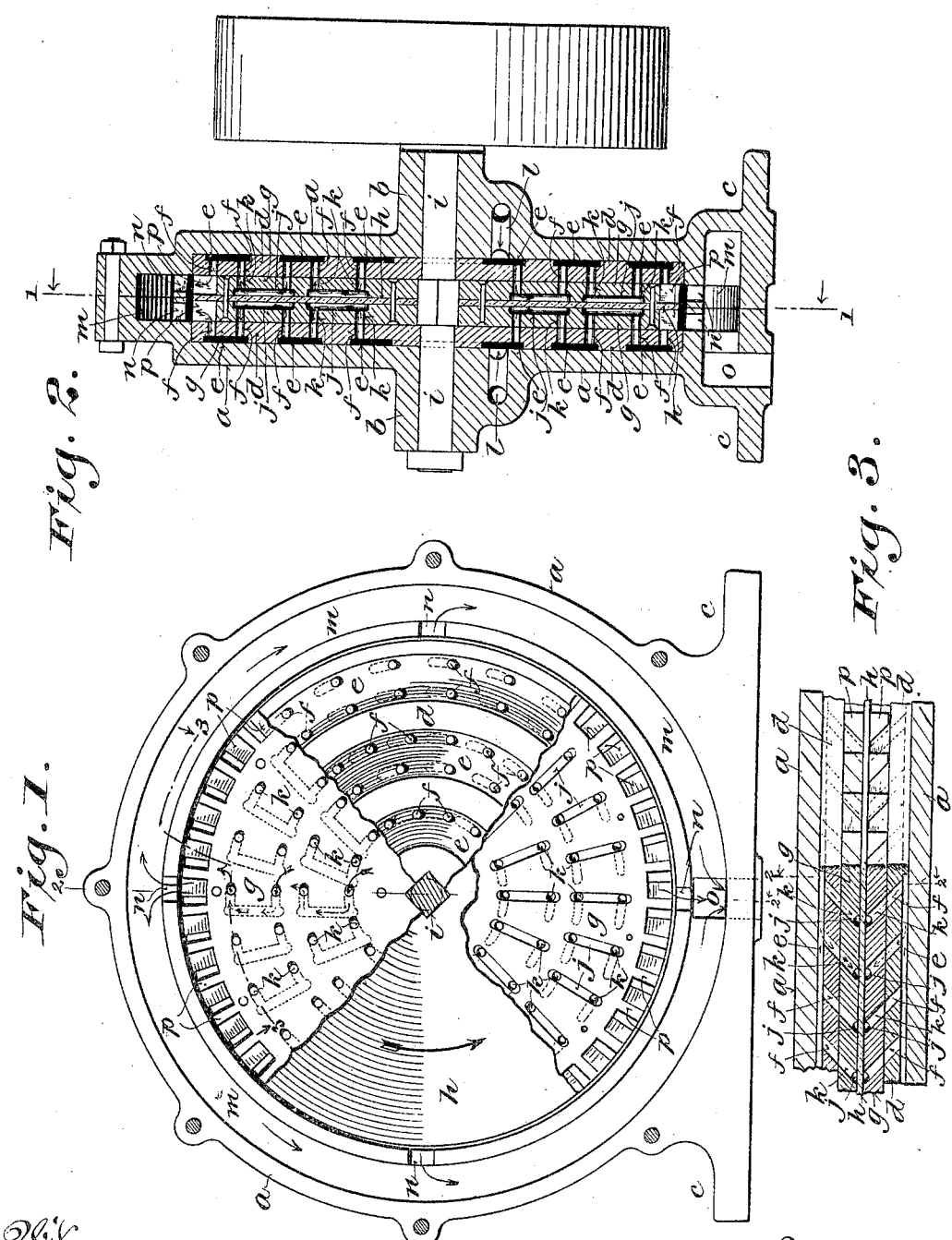

UNITED STATES PATENT OFFICE.

OLE O. STORLE, OF BURLINGTON, WISCONSIN.

ELASTIC-FLUID TURBINE.

No. 810,992.　　　Specification of Letters Patent.　　　Patented Jan. 30, 1906.

Application filed August 15, 1904. Serial No. 220,696.

*To all whom it may concern:*

Be it known that I, OLE O. STORLE, a citizen of the United States, residing at Burlington, in the county of Racine and State of Wisconsin, have invented certain new and useful Improvements in Elastic-Fluid Turbines, of which the following is a specification, reference being had to the accompanying drawings, forming a part thereof.

This invention relates to that class of turbines in which a wheel or runner is rotated by the impact of an elastic fluid against vanes or abutments with which the wheel or runner is provided. Its main objects are to utilize to the greatest possible degree the kinetic energy of the elastic fluid, to avoid or balance end thrust on the bearings of the rotary member of the turbine, and generally to improve the construction and operation of engines of this class.

It consists in certain novel features of construction and in the peculiar arrangement and combinations of parts, as hereinafter particularly described, and pointed out in the claims.

In the accompanying drawings like letters designate the same parts in the several figures.

Figure 1 is a transverse section on the line 1 1, Fig. 2, of a steam-turbine embodying the invention. Fig. 2 is a vertical longitudinal section on the line 2 2, Figs. 1 and 3, the section following the oblique direction of the passages in the nozzle-disks and runner as indicated on Fig. 3; and Fig. 3 is a section on the line 3 3, Fig. 1.

The casing of the turbine is composed of sections $a\ a$, separated in a plane at right angles to the axis of the turbine and secured together by flanges and bolts, so as to form a steam-tight joint between them. They are formed or provided with bearings $b\ b$ for the runner-shaft and with a suitable base $c$ for the turbine to stand upon. Within the casing, at each end thereof, are fitted circular nozzle-disks $d\ d$, having annular channels $e\ e$ in their outer faces next to the inner walls of the casing and passages $f\ f$ extending obliquely inward from said channels to the inner faces of the disks. Packing-rings (not shown) may be provided in the casing or disks to insure steam-tight joints between them on each side of the several channels $e$.

The runner or rotative member of the turbine consists of two circular plates or parts $g$, fitted to turn between the nozzle-disks $d$ and mounted with a central plate or partition $h$ upon a shaft $i$, which is fitted to turn in the bearings $b$ of the casing. The plates or parts $g$, with the intermediate plate or partition $h$, are bolted or riveted together and are fixed or prevented from turning on the shaft $i$ by any suitable means, such as a squared enlargement of the shaft fitting a corresponding hole in the runner. Each plate or part $g$ of the runner is formed in its inner face next to the partition $h$ with radial channels or passages $j$, communicating at their ends with openings or passages $k$, extending obliquely outward through the plate. These openings or passages $k$ are arranged in circular series to register at their outer ends with the inner ends of the similarly-arranged passages $f$ in the nozzle-disks $d$, and the ends of each runner-passage, comprising a channel or passage $j$ and two oblique openings or passages $k$, are arranged to register with nozzle-passages $f$, which communicate with different channels $e$. The passages $f$ in the nozzle-disks and the passages $k$ in the runner are correspondingly inclined in the same direction on both sides of the central partition $h$, as shown in Fig. 3.

The casing is formed on each side of the runner with a steam or other elastic-fluid supply connection and passage $l$, which communicates with the inner channel $e$ in the adjacent nozzle-plate. It is also formed around the periphery of the runner with an annular passage $m$, communicating at suitable intervals through ports $n$ with the runner-chamber and also with an exhaust port or passage $o$ in the base.

The runner plates or parts $g$ are formed or provided around their peripheries with radially-arranged vanes or abutments $p$, against which the adjacent nozzle-passages $f$ are directed.

If desired, a channel may be formed in the casing communicating with the spaces or passages between the vanes $p$ around the entire periphery of the runner.

My improved turbine operates as follows: Steam or other elastic fluid being admitted on both sides of the runner through the passages $l$ enters and fills the inner channels $e$, from which it is delivered through the inner row of oblique nozzle-passages $f$ into the inner row of runner-passages $k$, passing thence into the next outer channels $e$ through the radial passages $j$ and the next outer rows of registering passages $k$ and $f$, and so on in and out through the successive rows or series of connected and registering passages and channels, expanding by stages until it issues from the last rows of nozzle-passages $ff$ against the vanes or abutments $p$ and finally escapes through the ports $n$ and passage $m$ to the exhaust port or passage $o$. The impact of the numerous jets of steam or other elastic fluid directed by the nozzle-passages $f$ through the runner-passages $k$ against the side walls of the radial passages $j$, which serve as vanes or abutments, and the reaction of the steam or other fluid as it escapes through the passages $k$ and $f$ in a reverse direction from the outer ends of the passages $j$ coöperate to impart a powerful forward impulse to the runner, and the gradually-increasing number and area of the connected and registering channels and passages as the steam or elastic fluid approaches the periphery of the runner permit of successive stages of expansion and the utilization of the kinetic energy of the steam or other motive fluid to the fullest extent.

It should be understood that the passages $k$ in the runner are to be made close together or arranged so that some of them will always be in register or communication with nozzle-passages $ff$.

The nozzle channels or chambers $e\ e$ need not extend, as shown, continuously around the disks $d\ d$, but may be of segmental or other form, although the annular form shown is considered preferable.

Essentially the same arrangement of parts and passages may be embodied in a turbine having one or more sets or series of nozzles and runner-passages on one or both sides of the runner or having a casing, one or more nozzle plates or bodies, and a runner of different shapes; but substantially the arrangement and the forms shown are preferable, as they are simple and easy to make and reliable and effective in operation. In short, various modifications in the details of construction and arrangement of parts may be made without departing from the principle and intended scope of the invention.

I claim—

1. In an elastic fluid turbine the combination of a casing provided with nozzles arranged in a number of separate series and a runner having passages each adapted and arranged to receive the fluid from one series of nozzles and to discharge it back into another series in a direction to react upon the runner and coöperate with the direct impact of the fluid entering said passages in driving the runner forward, substantially as described.

2. In an elastic-fluid turbine the combination of a nozzle disk or body having chambers and oblique nozzle-passages communicating with said chambers, and a runner having passages opening through the same face thereof and arranged to register at their ends with said nozzle-passages, each runner-passage being arranged to receive motive fluid from one of said chambers and to discharge it in a reverse direction into the other and serving as a vane or abutment to receive the direct impact of the fluid as it enters and the reaction of said fluid as it escapes from the runner, substantially as described.

3. In an elastic-fluid turbine the combination of a nozzle disk or body having a series of chambers and oblique nozzle-passages communicating with said chambers, the number of said passages increasing from the supply toward the exhaust connection of the turbine, and a runner having corresponding series of passages opening obliquely at the ends through the same face in position to register with the nozzle-passages, each runner-passage being arranged to register at the ends with nozzle-passages communicating with different nozzle-chambers, substantially as described.

4. In an elastic-fluid turbine the combination of a casing provided with nozzle-chambers and nozzle-passages communicating with said chambers and arranged in circular series, and a runner having corresponding series of passages opening at both ends through the same face thereof and arranged to register with said nozzle-passages, each runner-passage being arranged to receive motive fluid from one nozzle-chamber and to discharge it into another, and the number of passages increasing in successive series, substantially as described.

5. In an elastic-fluid turbine the combination of a casing having fluid supply and exhaust connections, a series of nozzle chambers and passages communicating therewith and increasing in number and total area from the supply toward the exhaust connection, and a runner having corresponding series of passages each adapted and arranged to receive motive fluid from one series of nozzle-passages and to discharge it in a reverse direction into another series which communicate with and supply the motive fluid to the next series, substantially as described.

6. In an elastic-fluid turbine the combination of a casing, nozzle-disks having channels in their outer faces next to the inner walls of the casing and nozzle-passages extending from said channels to the inner faces of said disks, a runner composed of two parts separated by a partition transversely to the axis of the turbine and each having passages opening at both ends through its outer face in position to register with passages communicating with the channels in said disks, each runner-passage registering at its opposite ends with passages which communicate with different channels, substantially as described.

7. In an elastic-fluid turbine the combination of a casing composed of sections joined together in a plane transverse to the axis of the turbine, nozzle-disks fitted in said casing and having channels in their outer faces next to the inner walls of the casing and passages extending from said channels obliquely inward to the inner faces of the disks, a runner composed of two parts separated by a partition transversely to the axis of the turbine and fitted to turn between said disks, each part of the runner having radial passages opening obliquely through their outer faces in position to register with the passages in the nozzle-disks, and each runner-passage registering at its ends with passages which communicate with different channels in the adjacent nozzle-disk, substantially as described.

8. In an elastic-fluid turbine the combination of a casing having fluid supply and exhaust connections and provided with nozzle-passages arranged in circular series, and a runner having corresponding series of passages each adapted to receive motive fluid from one series of nozzle-passages and to discharge it in a reverse direction into another series, said runner also having a circular series of vanes or abutments arranged to receive motive fluid from the last series of nozzle-passages, substantially as described.

9. In an elastic-fluid turbine the combination of a casing having two fluid-supply connections at opposite ends, and an exhaust-passage communicating with the outer part of the runner-chamber, said casing being provided at both ends with nozzle chambers and passages communicating therewith and arranged in circular series, the inner channels or chambers communicating with the fluid-supply connections, and a runner having passages arranged in circular series on both sides thereof and each opening at both ends through the same face and being adapted and arranged to receive motive fluid from one nozzle channel or chamber and to discharge it into another, substantially as described.

10. In an elastic-fluid turbine the combination of a casing provided in the ends with nozzle chambers and passages arranged in circular series and a runner composed of two plates secured together with a partition-plate between them and each formed in its inner face with radial channels which are connected at the ends with its outer face by transverse passages, said passages being arranged in circular series to register at the ends with the nozzle-passages, substantially as described.

In witness whereof I hereto affix my signature in presence of two witnesses.

OLE O. STORLE.

Witnesses:
  CHAS. L. GOSS,
  HERBERT R. MANGER.